(12) United States Patent
Seth et al.

(10) Patent No.: US 8,589,804 B2
(45) Date of Patent: Nov. 19, 2013

(54) COLLABORATIVE ELECTRONIC BOOKS

(75) Inventors: Anupam Seth, Urbana, IL (US); Allie K. Watfa, Urbana, IL (US); Dale Nussel, Mahomet, IL (US); Jonathan Kilroy, Champaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 236 days.

(21) Appl. No.: 13/092,589

(22) Filed: Apr. 22, 2011

(65) Prior Publication Data

US 2012/0272159 A1 Oct. 25, 2012

(51) Int. Cl.
*G06F 3/00* (2006.01)
(52) U.S. Cl.
USPC .............................. 715/751; 715/753; 705/300
(58) Field of Classification Search
USPC .................... 715/751, 753; 709/204; 705/300
See application file for complete search history.

(56) References Cited

U.S. PATENT DOCUMENTS

| | | | |
|---|---|---|---|
| 2003/0009459 A1* | 1/2003 | Chastain et al. | 707/7 |
| 2008/0228876 A1* | 9/2008 | Johnson | 709/204 |
| 2009/0150303 A1* | 6/2009 | MacMillan et al. | 705/400 |
| 2012/0096087 A1* | 4/2012 | Curcelli | 709/204 |
| 2012/0215686 A1* | 8/2012 | Lauzon | 705/39 |

* cited by examiner

*Primary Examiner* — Weilun Lo
*Assistant Examiner* — Rashedul Hassan
(74) *Attorney, Agent, or Firm* — Mauriel Kapouytian Woods LLP; James Woods; Yousef Mian

(57) ABSTRACT

The present invention provides techniques relating to collaboratively authored stories and electronic books, and the writing thereof. Techniques are provided in which a template relating to a story, and a set of rules governing collaborative writing of the story by multiple user authors, are obtained. Writing contributions, for integration into the story, may be obtained from each of the user authors. A completed story is obtained, in which forming the completed story includes integrating the writing contributions. Access to the story, such as in the form of an electronic book, is provided to users, such as for a fee.

18 Claims, 5 Drawing Sheets

COLLABORATIVE ELECTRONIC BOOKS

BACKGROUND

Electronic book, or ebook, readership has grown over recent years at a very high rate. Additionally, electronic and online social networking and social interaction has also continued to grow. Yet new techniques, including, for example, techniques that successfully merge aspects or elements of the two, are few.

SUMMARY

Some embodiments of the invention provide systems and methods relating to collaboratively authored stories and electronic books, and the writing thereof. Techniques are provided in which a template relating to a story, and a set of rules governing collaborative writing of the story by multiple user authors, are obtained. Writing contributions, for integration into the story, may be obtained from each of the user authors. A completed story is obtained, in which forming the completed story includes integrating the writing contributions. Access to the story, such as in the form of an electronic book, is provided to users, such as for a fee.

While the invention is described with reference to the above drawings, the drawings are intended to be illustrative, and the invention contemplates other embodiments within the spirit of the invention.

DETAILED DESCRIPTION

Figure 1:
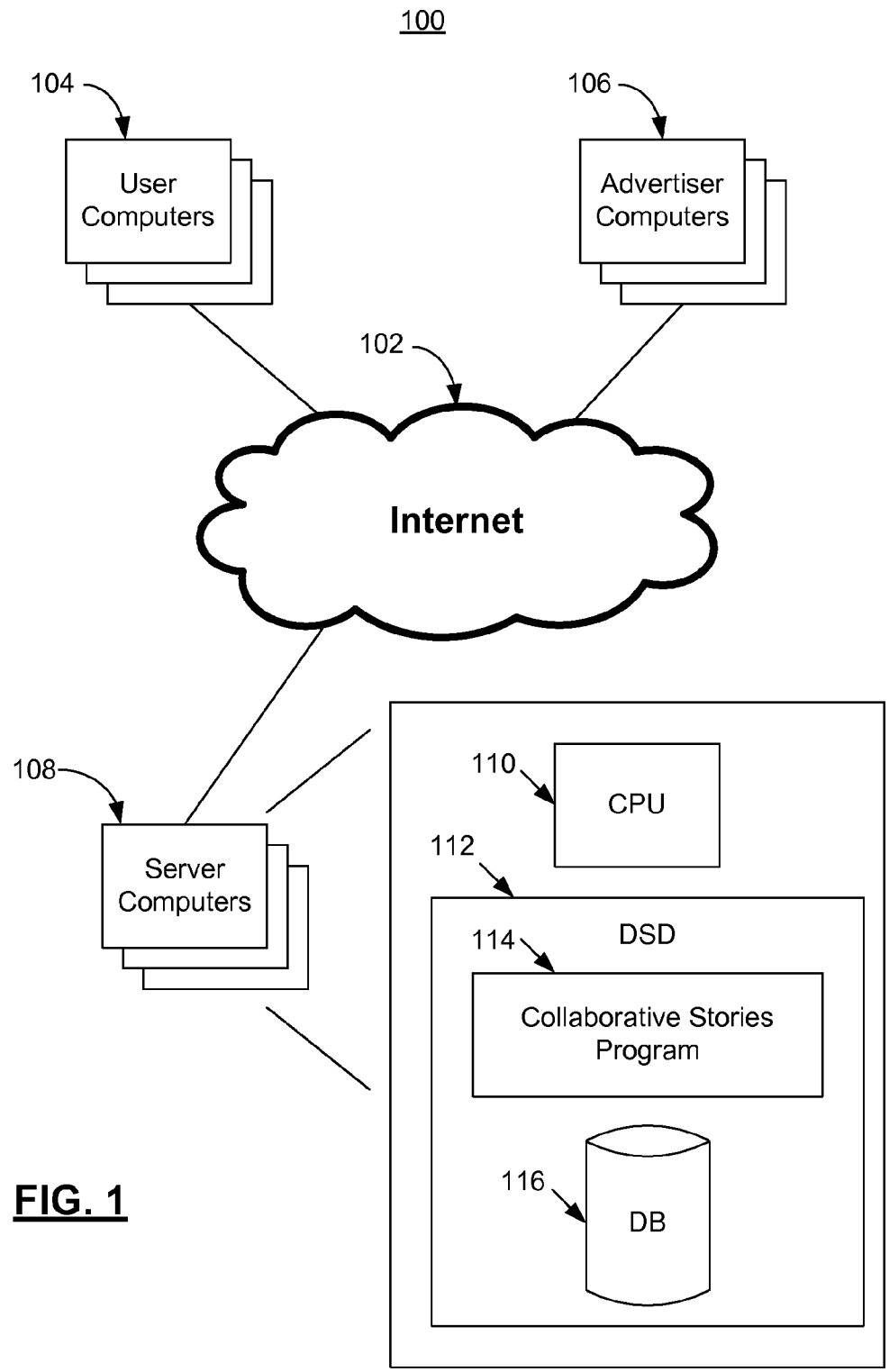
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and Collaborative Stories Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
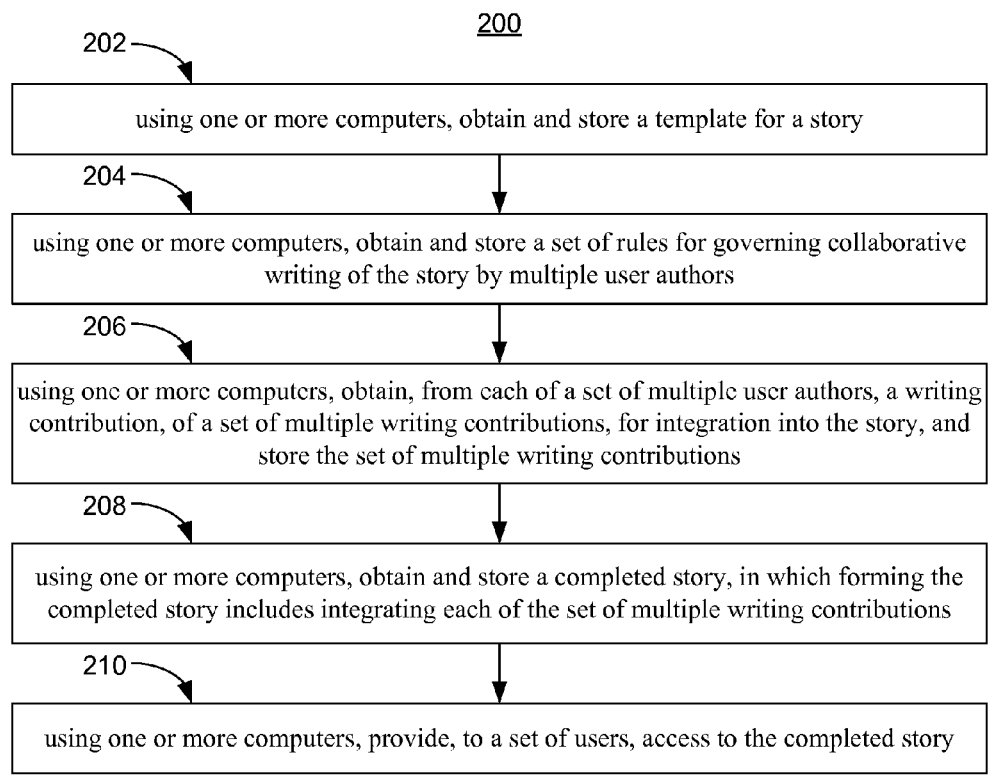
FIG. 2 is a flow diagram illustrating a method according to one embodiment of the invention.

FIG. 2 is a flow diagram illustrating a method 200 according to one embodiment of the invention. At step 202, using one or more computers, a template for a story is obtained and stored.

At step 204, using one or more computers, a set of rules is obtained and stored for governing collaborative writing of the story by multiple user authors.

At step 206, using one or more computers, from each of a set of multiple user authors, a writing contribution is obtained, of a set of multiple writing contributions, for integration into the story, and the set of multiple writing contributions is stored.

At step 208, using one or more computers, a completed story is obtained and stored, in which forming the completed story includes integrating each of the set of multiple writing contributions.

At step 210, using one or more computers, to a set of users, access is provided to the completed story.

Figure 3:
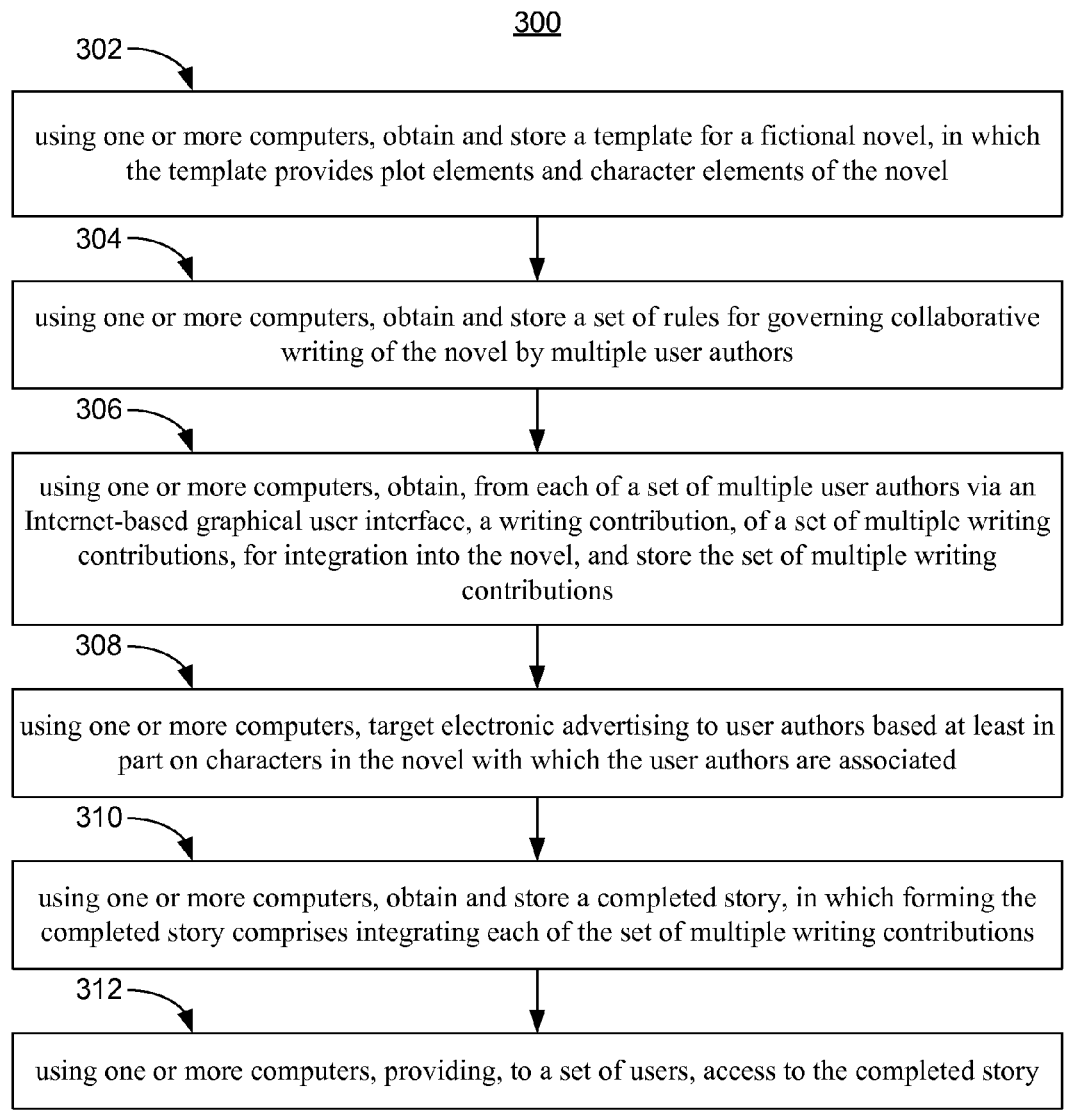
FIG. 3 is a flow diagram illustrating a method according to one embodiment of the invention.

FIG. 3 is a flow diagram illustrating a method 300 according to one embodiment of the invention. At step 302, using one or more computers, a template for a fictional novel is obtained and stored, in which the template provides plot elements and character elements of the novel.

At step 304, using one or more computers, a set of rules is obtained and stored for governing collaborative writing of the novel by multiple user authors.

At step 306, using one or more computers, from each of a set of multiple user authors via an Internet-based graphical user interface, a writing contribution is obtained, of a set of multiple writing contributions, for integration into the novel, and the set of multiple writing contributions is stored.

At step 308, using one or more computers, electronic advertising is targeted to user authors based at least in part on characters in the novel with which the user authors are associated.

At step 310, using one or more computers, a completed story is obtained and stored, in which forming the completed story comprises integrating each of the set of multiple writing contributions.

At step 312, using one or more computers, to a set of users, access is provided to the completed story.

Figure 4:
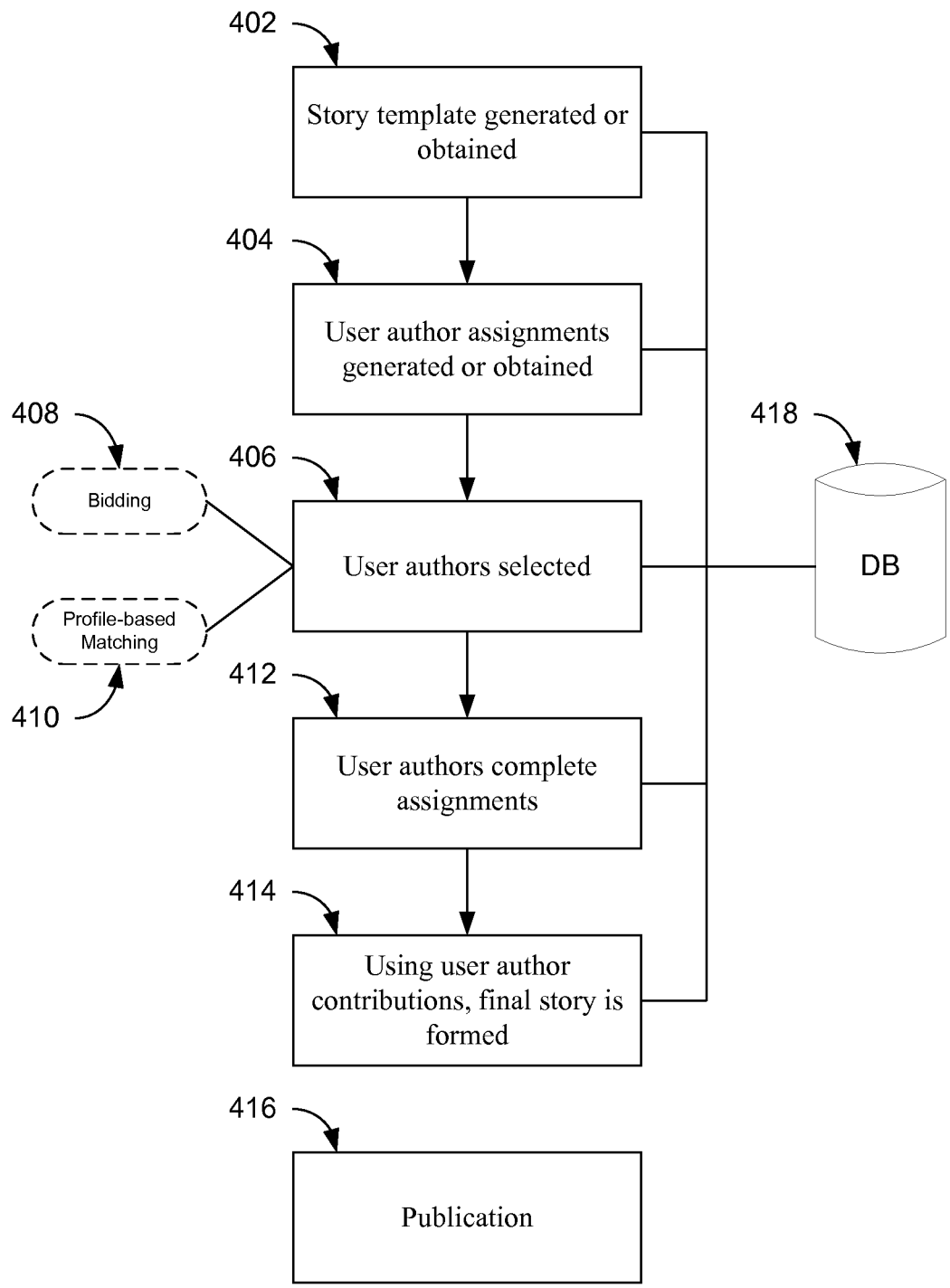
FIG. 4 is a flow diagram illustrating a method according to one embodiment of the invention.

FIG. 4 is a flow diagram illustrating a method 400 according to one embodiment of the invention. As depicted, various information that may be generated or obtained and may be stored in one or more databases 418.

At step 402, a story template is obtained, which may, for example, include plot elements, character elements, set out story needs, etc.

At step 404, user author assignments are obtained or generated.

At step 406, user authors are selected, which may or may not include such things as, for example, bidding 408 or profile-based matching 410 such as of candidate user authors to story characters. For example, in some embodiments, user authors may be matched to characters based on factors including various profile or online information, occupation, demographics, interests, characteristics, location, etc. In some embodiments, a template may identify personal traits associated with characters, such as feelings, self-perceptions or self-image, traits such as being angry or caring, behavioral tendencies, etc., and available profile information about user authors or candidate user authors can be matched to such.

At step 412, user authors complete assignments relating to the story. This may include, for example, user authors writing portions of the story. User authors may collaborate merely by virtue of contributing separately to an integrated story, or may collaborate by interacting with regard to assignments, or in other ways.

At step 414, using user author contributions, such as in relation to assignments, a final story is formed.

At step 416, the final story is published.

Figure 5:
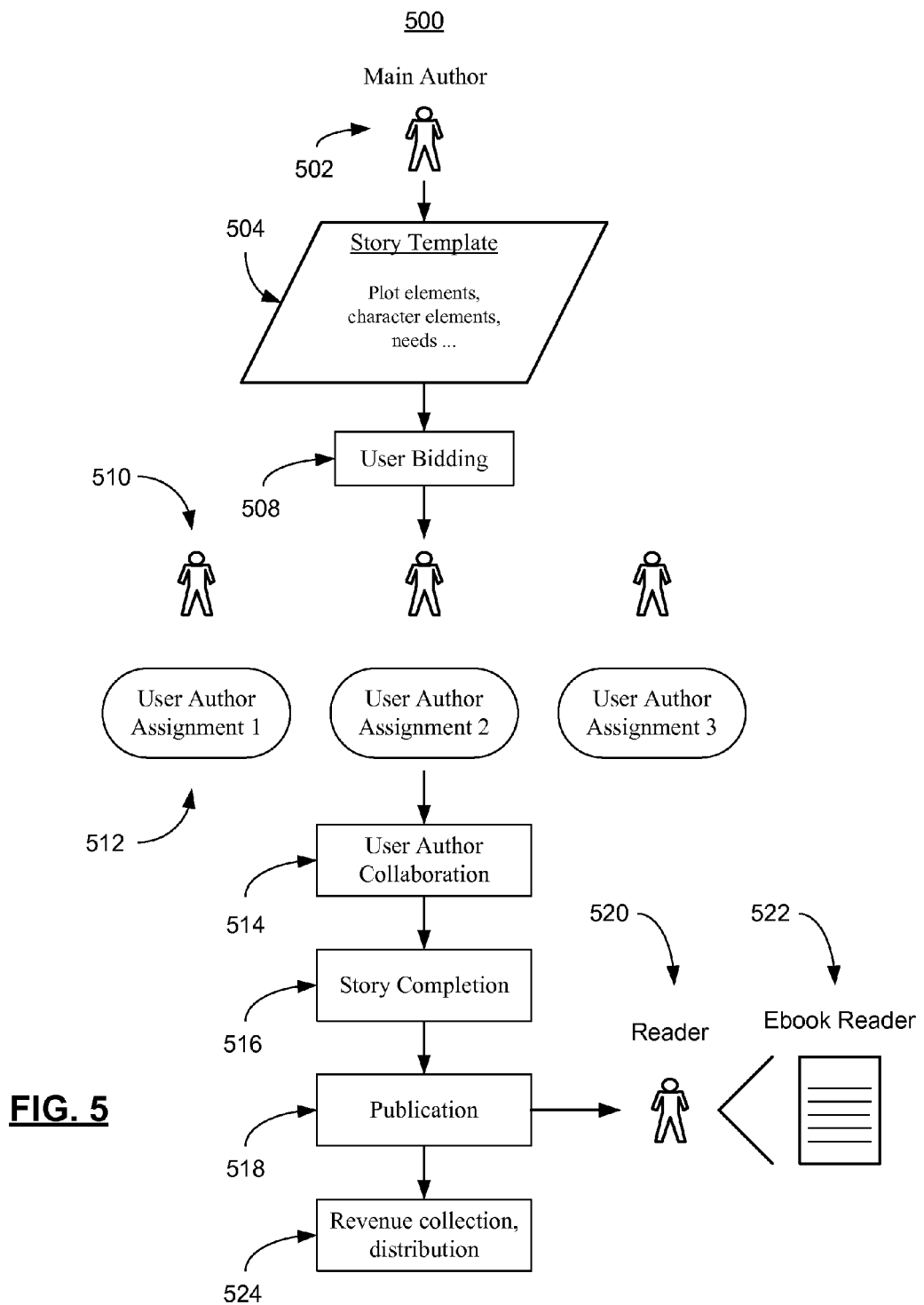
FIG. 5 is a block diagram illustrating one embodiment of the invention.

FIG. 5 is a block diagram 500 illustrating one embodiment of the invention.

As depicted, a main author 502 generates or is otherwise responsible for producing a story template 504, which may include, for example, plot elements, character elements, other story elements, user author assignments or assignment information, structure, skeleton, outline, theme, issues or problems of elements of the story, chapter information, character development information, ending information, cultural reference information, etc. The template may also set forth story needs or other parameters associated with the story or user author assignments.

At block 508, using bidding takes place, such as to obtain user author roles or assignments.

Blocks 512 represents multiple user author assignments, assigned to multiple user authors 510.

Block 514 represents user author collaboration, such as in connection with user author assignments.

Block 516 represents story completion using user author contributions.

Block 518 represents some form of publication. As one example, the completed story may be published as an ebook, for purchase by an ebook reader 520 who may access the purchased story on an ebook reader device 522. Of course, other forms of publication are contemplated, including paper novels, other forms of electronic publication, etc.

Some embodiments of the invention include a recognition that eBook readership has grown rapidly over recent years, and publication in ebook form is also a growing trend. In some ways, it may be viewed that ebooks have typically utilized a "produced by one to be sold to many" type of model, similar to that of traditional books. Some embodiments of the invention, however, provide a "produced by many sold to many" ebook model.

Some embodiments of the invention include a recognition that, in all of us, there is a "story to tell", or a desired to work as part of a team and contribute toward a story. Some embodiments provide an ability to bring different individual experiences and substories, story elements or story components together to form a complete story or book, also providing an excellent opportunity to capture and leverage individuals' interests. Some embodiments further provide a new advertising targeting technique, which may, for example, use individuals' personal and social network interests surrounding books and writing.

Some embodiments include various foundational elements. These may include online collaboration and socialization through the medium of writing. Furthermore, multiple user author models or roles may be provided or specified, which may allow or specify division of labor, levels of control, etc. Author and publisher models may be provided that allow collaborators to create their own pieces of literature. Some embodiments also provide a fun and engaging on-the-go activity for mobile users.

Some embodiments relate to enabling people to collaboratively write a book, article, blog, etc., that may be published. Participants and their relationships can vary. For example, user authors may know each other or just be strangers that just want to help, and may or may not have profiles that meet certain criteria or expertise specified for the projects.

In some embodiments, for example, by combining a social aspect to book writing, the resulting product's quality and depth will be enhanced, not to mention providing enjoyment in the process by the participants.

Some embodiments provide techniques that, for example, help identify the team, provide an organizational structure, provide a vehicle to show the resulting work to the ebook community, help with monetization, and provide a new type of advertisement or content targeting, and targeting opportunity, which may be based on user or user author interest relating to stories and books, and authoring such.

In some embodiments, an original story author may have an idea for book but lack the expertise on the subject to complete the book. By identifying the expertise needed to complete the book, the author can use a system according to an embodiment of the invention to, for example, to search user profiles, or anonymous user profiles, for users with the right expertise, and for those that have indicated that they would like to be contacted as user authors for projects.

For example, supposing an author starts writing a book including a chapter describing how a hero saves a child's life in a building fire. One who has experienced such a reality could add a lot of realism to the passage. As another example, suppose there is a description in another chapter about slums in a third-world country. A user from such a place could add insight in that section. For another chapter on winning a government contract, an employee of a defense supply company, for example, could contribute meaningfully to that.

Furthermore, in some ways, some embodiments can be analogized as bringing reality TV elements to the print medium. Supposing, for example, that one is describing the life of three college students. Why not let real students contribute by relating aspects of their life? Additionally, there might be other perspectives that might be interesting, such as that of a professor, based on his or her decades of teaching. Similarly, parents of college-going kids could chip-in their own perspective, adding a new dynamic to the whole writing experience.

In some embodiments, the original story author can ask for certain types of area experts. This could include, for example, a physicist that understands the conditions on a moon of Saturn, or a biologist that could theorize on what a life form might be like in a hostile environment like a Saturn moon. If users with such expertise are listed as being interested in authoring books, then the system can send them or allow them to be sent a request for their participation, etc.

In some embodiments, there can be multiple primary authors who want to train others that are less experienced in writing. They can setup mentoring type roles and ask for users that have expressed interest but have not been part of a book writing experience before, for example.

In some embodiments, a main author will generate a story template, including a topic or plot, with distributed roles and permissions for other user collaborators. User authors may then collaborate in order to get the book completed.

In some embodiments, to organize the production of a book, techniques utilize overlay the social connections between individuals to identify roles and define work scope per role. This organizational structure can bring the glue to allow the social generation of a product to be efficient and effective. These organizing structures or work division breakdowns may evolve over time and offer subsequent projects the best aspects or the ones that benefited earlier projects. Authors may also have the freedom to create a new work breakdown structure as needed.

In some embodiments, in part by assigning scope to the roles of producing a book and controls over contributing authors' permissions to change different aspects of the story, the system may allow a social book building experience to be successful.

In some embodiments, the system may have the following aspects.

1—The system will distribute roles based, or based in part, on users' profiles and standards. For example, if a user occupation is home builder, and the book involves a fictional character who is in home construction, then the system may assign the user with that character because of the good fit.
2—The system may use the rules that are submitted by the originator of the book, and may monitor, determine time line or other aspects, and apply the rules to development or integration of the ebook.
3—The system may perform language translation when needed to ensure that the ebook develops in one language.
4—The system may perform editing and fill in, help fill, or be used to help fill in, in a skeleton base with context to form the book.
5—In connection with privacy, users who abuse the system may be banned from participating in future collaborations or projects.

In some embodiments, multiple roles can be defined such as master author, chapter authors, and paragraph authors. The master author role could have responsibilities including setting the genre, subject, main characters, etc., of the story. Chapter author roles could be to set the skeletons of chapters, or define additional characters as needed. Paragraph authors could add the content to sections within the chapters, building the story specifics based on a rich set of experiences.

In some embodiments, there could just be three master authors that collaborate on all aspects of producing the book.

In some embodiments, a mentoring relationship can exist where some aspects of the writing is completed and then goes to a specific person for review or feedback.

In some embodiments, a community relationship can exist where some aspect of the writing is completed by a group or individual and then goes to a wider audience of reviewers for feedback.

In some embodiments, a sole author drives the initial organization, but then the system takes over the work distribution and locating the additional talent to complete the work.

One embodiment of the invention could include the following aspects or steps.

1—Originator(A) enters the system and defines:
  Story Theme.
  Story Title.
  Story Characters.
2—Originator(A) defines rules for the system to apply.
3—Originator(A) opens the story idea to public.
4—User authors join the collaborative effort.
5—The system will perform the following, based on factors including users' profiles and standards:
  Distribute roles.
  Distribute characters per users.
6—User authors start submitting to the system their:
  Paragraphs.
  Character development.
7—The system applies rules and works to accept/reject/submit for voting the different input from users.
8—The system fills out a skeleton base with context and detail.

One specific example of the above is provided as follows.
1—Originator(A) enters system and defines:
  Story Theme: Vampires.
  Story Title: Vampires in Agony.
  Story Characters: A group of vampires, their day to day life in the community and how they cope with it.
  Story Skeleton:
Getting introduced to the characters (A, B, C and D)
  Getting the back story of the characters.
  Show the character personalities.
  One of the characters tries to deviate from normal.
  There is chaos within the group.
  The group ends in agony.
2—Originator(A) defines rules for System to apply.
Rule 1: No one person can write about multiple characters.
Rule 2: limit of 10 paragraphs accepted per person.
Rule 3: language accepted: English, Spanish and French (with translation).
Rule 4: 50 user limit.
3—Originator(A) opens story to public.
4—Users join the collaborative effort (30 users join).
5—The system will perform the following based on users profile and standards:
  Distribute roles: permissions, role definitions, etc.
  Distribute characters per users: depending on user profile information, the system assigns one or more characters per user.
6—Users start submitting to the system their:
  Paragraphs.
  Character development.
7—The system applies rules and works to accept/reject/submit for voting the different input from users.
8—The system fills in a skeleton base with context and detail to form the book.

Some embodiments provide solutions for complications that may arise in some instances. One potential complication is too much disorganization or chaos. This may be addressed, for example, by having the creator of a book idea have full permissions and define an immutable outline or structure for the book's characters. He or she could then assign roles, such as super-editor, editor, super-contributor, and individual contributor, to people who would like to contribute to the book idea. The original author could also set up a monetization scheme as discussed further herein.

Another complication could be collaborative conflict. This could be addressed by limiting or not allowing direct communication between contributors, or some of them.

Another complication could relate to a book ending. To address this, rules could provide criteria for determining at what point the book ends.

Furthermore, in some embodiments, by analysis of project statistics, such as the rate of completion, or pages generated per week, the system can may determine if the work breakdown is effective, and may offer suggestions or recommendations, such as for change, when needed. At the end of the project, team members could rank the effectiveness of the work breakdown structure, and this could be used to aid future teams.

In some embodiments, the book may be made available, such as online or through a Web portal or site, or through a new property on such a portal or site. In some embodiments, the user authors can elect to show the work as it is created, taking comments from readers to improve content on the fly, or alternatively they may keep it secret or secured until completed. In some embodiments, the system will provide a vehicle to offer the story as an ebook, such as to Internet capable devices, such as for a fee.

Some embodiments propose, for example, a system for social collaborative online writing that could allow multiple users, such as typical, every day people, to act as authors to write a collaborative book, blog, etc. Each user could contribute some part of the book and share in its ownership. There could also be a monetization scheme, such as by the leader, such as in terms of distribution of publication or fee revenue, such as on a pay per page/chapter contributed basis, etc.

In some embodiments, a bidding component or system, of various types, is also contemplated, such as for supporting authors or experts for projects. In some embodiments, publishers can take bids from authors for a book genre or idea. In some embodiments, authors can take bids from publishers that want that specific authors or types of authors to drive the book. In some embodiments, authors themselves can bid for other high demand authors to contribute, or in relation to any other role such as high demand area experts, for example.

In some embodiments, an underlying financial incentive will be a share of the book's profits. The division of the profits can be, for example, negotiated or set by factors that may include the system's work breakdown structure.

For example, in some embodiments, the system will help prioritize projects for contributors in high demand by allowing project authors bid for their contribution.

In some embodiments, the system will help authors secure the talent caliber they want by giving up more of the profit to secure such talent.

In some embodiments, the system will offer no distribution of profit unless the book generates income.

In some embodiments, publishers and even companies could sponsor or support book ideas if they end up working out well. Since the book is a collaborative effort, the revenue generated by the ebook, which could include through advertising, may be shared by the individuals who helped form the ebook.

Some embodiments include advertisement targeting, including interest-based targeting. For example, since user author addition may be based on user experience or tastes (such as likes and dislikes) and interest (such as fascination with certain kinds of products), user author interest can be effectively identified and targeted including use of such factors (potentially along with many other factors, of course).

For example, if a user author adds the following line: "Sam fancies fish restaurants. He goes there at least once a week and makes sure that he gets his fair share of protein." With this, the system can detect that there is an interest by the user author in fish restaurants and can, for example, show the user author an advertisement or online advertisement relating to a seafood restaurant, such as "Red Lobster".

Some embodiments allow various types of people, including people who would otherwise not be likely to be book contributors, to collaborate with others, utilizing talent that might otherwise remain hidden. In a sense, the talent of the crowd can exceed that of any individual contributor. The creator of this social media may get to choose a template for the book, with distributed roles and permissions for other users or collaborators. Other connected users may then read or collaborate to help get the book completed. In some ways, in a manner analogous to the way in which video Web sites drastically changed and improved online video by allowing regular users to upload videos, some embodiments of the invention could drastically change and improve the print industry. Some embodiments break down traditional entry barriers by providing an openly or widely available ebook creation system, that can be used in publishing ebooks available for download.

Some embodiments add a new fun social activity to the social space dimension, which could also be lucrative. Furthermore, in some embodiments, users can share passages or chapters as an ebook is written, which can, for example, increase user Web site portal visits and engagement, and profitability for such sites or portals. Still further, some embodiments increase advertisement inventory and sales, and improve targeting including real-time targeting, such as by leveraging user interest as may be evidenced in relation to a collaborative book or book effort, which can include, among other things, book topics, plots or characters, user author roles or writings, user collaboration which may include social networking activities and communications such as real-time communications, etc.

While the invention is described with reference to the above drawings, the drawings are intended to be illustrative, and the invention contemplates other embodiments within the spirit of the invention.

The invention claimed is:

1. A method comprising:
using one or more computers, obtaining and storing a template for a story;
using one or more computers, obtaining and storing a set of rules for governing collaborative writing of the story by multiple user authors;
using one or more computers, obtaining, from each of a set of multiple user authors, a writing contribution, of a set of multiple writing contributions, for integration into the story, and storing the set of multiple writing contributions, wherein user authors bid for user author roles;
using one or more computers, obtaining and storing a completed story, wherein forming the completed story comprises integrating each of the set of multiple writing contributions; using one or more computers, providing, to a set of users, access to the completed story; and
using one or more computers, targeting electronic advertising to user authors based at least in part on characters in the story with which the user authors are associated.

2. The method of claim 1, comprising targeting electronic advertising to particular user authors based at least in part on content of writing contributions provided by the particular user authors.

3. The method of claim 1, wherein user authors collaborate online regarding writing contributions.

4. The method of claim 1, wherein the template comprises plot elements of the story and character elements of the story.

5. The method of claim 1, wherein the set of rules comprises rules governing participation of user authors.

6. The method of claim 1, wherein the set of rules comprises rules defining and limiting roles of user authors with regard to contributing in relation to the story.

7. The method of claim 1, comprising a user editor having a role in integrating writing contributions of the set of multiple writing contributions.

8. The method of claim 1, comprising a master author who forms the completed story at least in part by integrating writing contributions of the set of multiple writing contributions.

9. The method of claim 1, wherein particular user authors are selected at least in part to provide writing contributions relating to particular characters in the story to which the particular user authors are matched, and wherein a particular user author is matched to a particular character in the story based at least in part on a profile of the particular user author being similar to a profile of the particular character in the story.

10. The method of claim 1, wherein candidate user authors bid for user author roles.

11. The method of claim 1, comprising publishing the completed story.

12. The method of claim 1, comprising publishing the completed story as an ebook.

13. The method of claim 1, comprising providing revenue to user authors based on sales relating to the completed story.

14. The method of claim 1, wherein the completed story is a fictional novel.

15. A system comprising:
one or more server computers coupled to a network; and
one or more databases coupled to the one or more server computers;
wherein the one or more server computers are for:
obtaining and storing a template for a story;
obtaining and storing a set of rules for governing collaborative writing of the story by multiple user authors;
obtaining, from each of a set of multiple user authors, a writing contribution, of a set of multiple writing contributions, for integration into the story, and storing the set of multiple writing contributions, wherein user authors bid for user author roles;
obtaining and storing a completed story, wherein forming the completed story comprises integrating each of the set of multiple writing contributions;
providing, to a set of users, electronic access to the completed story; and
targeting electronic advertising to user authors based at least in part on characters in the story with which the user authors are associated.

16. The system of claim 15, wherein the access to the completed story is provided for a fee.

17. The system of claim 15, wherein the template comprises plot elements of the story and character elements of the story.

18. A non-transitory computer readable medium or media containing instructions for executing a method comprising:
using one or more computers, obtaining and storing a template for a fictional novel,
wherein the template provides plot elements and character elements of the novel;
using one or more computers, obtaining and storing a set of rules for governing collaborative writing of the novel by multiple user authors;
using one or more computers, obtaining, from each of a set of multiple user authors via an Internet-based graphical user interface, a writing contribution, of a set of multiple writing contributions, for integration into the novel, and storing the set of multiple writing contributions, wherein user authors bid for user author roles;
using one or more computers, targeting electronic advertising to user authors based at least in part on characters in the novel with which the user authors are associated;
using one or more computers, obtaining and storing a completed story, wherein forming the completed story comprises integrating each of the set of multiple writing contributions; and
using one or more computers, providing, to a set of users, access to the completed story.

\* \* \* \* \*